(12) United States Patent
Feng et al.

(10) Patent No.: US 7,370,999 B2
(45) Date of Patent: May 13, 2008

(54) LIGHT GUIDE PLATE AND SURFACE LIGHT SOURCE USING SAME

(75) Inventors: Di Feng, Beijing (CN); Xing-Peng Yang, Beijing (CN); Guo-Fan Jin, Beijing (CN); Qiao-Feng Tan, Beijing (CN); Ying-Bai Yan, Beijing (CN); Shou-Shan Fan, Beijing (CN)

(73) Assignees: Tsinghua University, Haidian District, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 106 days.

(21) Appl. No.: 11/249,300

(22) Filed: Oct. 13, 2005

(65) Prior Publication Data

US 2006/0082884 A1 Apr. 20, 2006

(30) Foreign Application Priority Data

Oct. 14, 2004 (CN) .................... 2004 1 0051871

(51) Int. Cl.
*F21V 7/04* (2006.01)
(52) U.S. Cl. .................. 362/619; 362/608; 362/615; 362/620; 362/617
(58) Field of Classification Search .................. None
See application file for complete search history.

(56) References Cited

U.S. PATENT DOCUMENTS 5,997,148 A * 12/1999 Ohkawa .................... 362/619

| 6,421,104 | B1 |   7/2002 | Richard ................... 349/63 |
|-----------|----|----------|-----------------------------------|
| 6,636,283 | B2 |  10/2003 | Sasagawa et al. .......... 349/65 |
| 6,974,241 | B2 * | 12/2005 | Hara et al. ................ 362/606 |
| 7,039,286 | B2 * |  5/2006 | Leu et al. .................. 385/129 |
| 2001/0035927 | A1 | 11/2001 | Sasagawa |
| 2002/0048163 | A1 * |  4/2002 | Kawakami et al. ........ 362/31 |
| 2003/0214848 | A1 | 11/2003 | Ehara et al. ............... 362/558 |
| 2005/0190578 | A1 * |  9/2005 | Miyashita ................. 362/615 |

FOREIGN PATENT DOCUMENTS

JP 9133920 A 5/1997
JP 10-199316 7/1998

* cited by examiner

*Primary Examiner*—Sharon E. Pay
*Assistant Examiner*—Kristen A Manskar
(74) *Attorney, Agent, or Firm*—Morris Manning Martin LLP; Tim Tingkang Xia, Esq.

(57) ABSTRACT

An exemplary light guide plate (500) includes: a light incident portion (51) for receiving a light; a light reflecting portion (52) for reflecting the light input through the light incident portion; and a light emitting portion (53) opposite to the light reflecting portion, for outputting the reflected light. The light incident portion includes a first diffractive optical element (512) located thereat. The first diffractive optical element includes a plurality of protrusions (512a) each having a curved surface, with the protrusions being arranged symmetrically opposite to each other across a central axis of symmetry of the first diffractive optical element. The light emitting portion may include a second diffractive optical element (532) located thereat. The second diffractive optical element includes a plurality of elongate protrusions, with the protrusions being arranged symmetrically opposite to each other across a central axis of symmetry of the second diffractive optical element.

15 Claims, 10 Drawing Sheets

LIGHT GUIDE PLATE AND SURFACE LIGHT SOURCE USING SAME

FIELD OF THE INVENTION

The present invention relates to display devices such as liquid crystal displays (LCDs), and more particularly to a light guide plate (LGP) and a surface light source using the same for providing illumination to a display device such as an LCD.

BACKGROUND

In general, an LCD apparatus has advantages over a CRT (cathode ray tube) type display apparatus in respect of its low weight and small size. The advantage of an LCD derives from its use of liquid crystal for providing images. The liquid crystal is controlled by an electric field. Under an applied electric field, liquid crystal molecules are oriented in a predetermined direction parallel to a direction of the electric field. Light transmittance for providing images varies according to the orientations of the liquid crystal molecules.

The LCD apparatus requires a light source to transmit light through the liquid crystal. The quality of the displayed images depends on a uniformity of the light provided to the liquid crystal, and on a brightness of the light provided to the liquid crystal.

In general, the light source provides a uniform surface light. The light source is typically a backlight assembly. An LGP is a vital component of the backlight assembly. A basic function of the LGP is to change a propagation direction of light introduced into the LGP through a light incident surface thereof, so that the light is emitted from a light emitting surface of the LGP. In one kind of LGP, the light incident surface is roughly perpendicular to the light emitting surface. A simple transparent LGP of this kind is capable of re-directing light, but only to a limited extent. The emitted light provided may have unsatisfactory brightness. Hence, various LGPs having a plurality of tiny reflectors on a surface opposite to the light emitting surface have been devised.

FIG. 11 shows a backlight assembly with another kind of conventional LGP. The LGP includes a cavity formed at a light incident surface thereof. A light emitting diode (LED) is received in the cavity. Thus most light emitted from the LED is introduced into the LGP, and light energy is efficiently utilized. However, a thickness and a weight of the LGP have to be undesirably large. In addition, because the LED is located inside the LGP, it is difficult to dissipate heat generated by the LED. The LED is liable to overheat and fail.

FIG. 12 shows part of another backlight assembly with another kind of conventional LGP. A light coupling element such as a lens is provided between a point light source and the LGP. However, the backlight assembly is not compact, and the relative positions of the various light-emitting and optical components must be fixed with high precision.

What is needed is an LGP having high light energy utilization and a compact configuration.

SUMMARY

A light guide plate provided herein generally includes: a light incident portion for receiving light, the light incident portion including at least one first diffractive optical element located thereon; a light reflecting portion for reflecting the light input through the light incident portion; and a light emitting portion opposite to the light reflecting portion, for outputting the input light including the reflected light.

The at least one first diffractive optical element may comprise a plurality of protrusions each having a curved surface, with at least two of the protrusions being arranged symmetrically opposite to each other across a central axis of symmetry of the at least one first diffractive optical element.

The at least one first diffractive optical element preferably has a phase retardation represented by $\phi(x)$, which satisfies the following equation:

$$\phi(x) = k_0 n_2 (f - \sqrt{f^2 + x^2}),$$

wherein f represents a focal length of the at least one first diffractive optical element, n2 represents an index of refraction of a material located at a focus of the at least one first diffractive optical element, x represents a distance from any point on a curved surface of the at least one first diffractive optical element to the central axis of symmetry. Further, $k_0$ represents a quantity of waves of the light input through the at least one first diffractive optical element, and is calculated by the following equation: $k_0 = 2\pi/\lambda$. $\lambda$ represents a wavelength of the light input through the at least one first diffractive optical element if such light travels in a vacuum.

Additionally, preferably, any point on a curved surface of the at least one first diffractive optical element defines a depth to a common imaginary plane that extends across the light incident portion at an inmost end of the at least one first diffractive optical element. The depth is represented by y(x), which satisfies the following equation:

$$y(x) = \frac{n_2}{n_1 - n_2} \left| \sqrt{f^2 + x^2} - f - m\lambda_2 \right|$$

$$x_{m-1} \leq |x| \leq \min(x_m, D/2),$$

wherein n1 represents an index of refraction of a material of the at least one first diffractive optical element, and D represents a length of the at least one first diffractive optical element. Further, $\lambda_2$ is calculated by the following equation: $\lambda_2 = \lambda/n_2$. m represents a sequence number of a protrusion which the measured point is located on, and is any natural number up to $m_{max}$, with the protrusion adjacent the central axis of symmetry having an m value of 1 and the protrusion farthest from the central axis of symmetry having an m value of $m_{max}$. $x_m$ represents a shortest distance from an apex of each of the protrusions to the central axis, which is calculated by the following equation:

$$x_m = [2mf\lambda_2 + (m\lambda_2)^2]^{1/2}, \text{ and } x_0 = 0.$$

It is preferable that the apexes of each of the protrusions have a same depth y(x).

Alternatively, the at least one first diffractive optical element comprises a plurality of protrusions each having two flat surfaces, with at least two of the protrusions being arranged symmetrically opposite to each other across the central axis of symmetry of the at least one first diffractive optical element.

In preferred embodiments, the at least one first diffractive optical element protrudes outwardly from a main body of the light guide plate. Alternatively, the at least one first diffractive optical element defines a plurality of cutouts each having a curved extremity, with at least two of the cutouts being arranged symmetrically opposite to each other across a central axis of symmetry of the at least one first diffractive optical element.

The light emitting portion may include at least one second diffractive optical element located thereat. The at least one second diffractive optical element comprises a plurality of elongate, curved protrusions, with at least two of the protrusions being arranged symmetrically opposite to each other across a central axis of symmetry of the at least one second diffractive optical element. Alternatively, the at least one second diffractive optical element comprises a plurality of elongate protrusions having flat surfaces, with at least two of the protrusions being arranged symmetrically opposite to each other across a central axis of symmetry of the at least one second diffractive optical element.

The light guide plate may be rectangular or wedge-shaped.

These and other features, aspects and advantages will become more apparent from the following detailed description and claims, and the accompanying drawings.

DETAILED DESCRIPTION OF THE PREFERRED EMBODIMENTS

Figure 1:
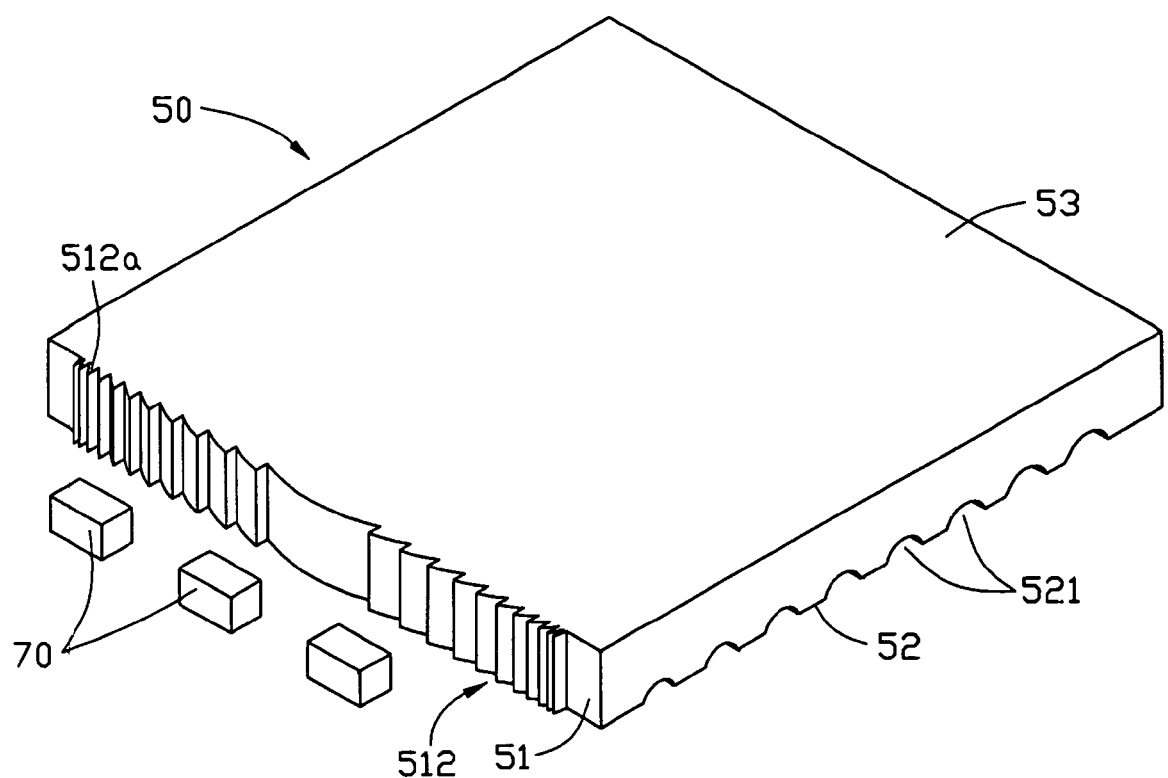
FIG. 1 is a simplified, isometric view of an LGP in accordance with a first embodiment of the present invention, together with three LEDs.
Figure 2:
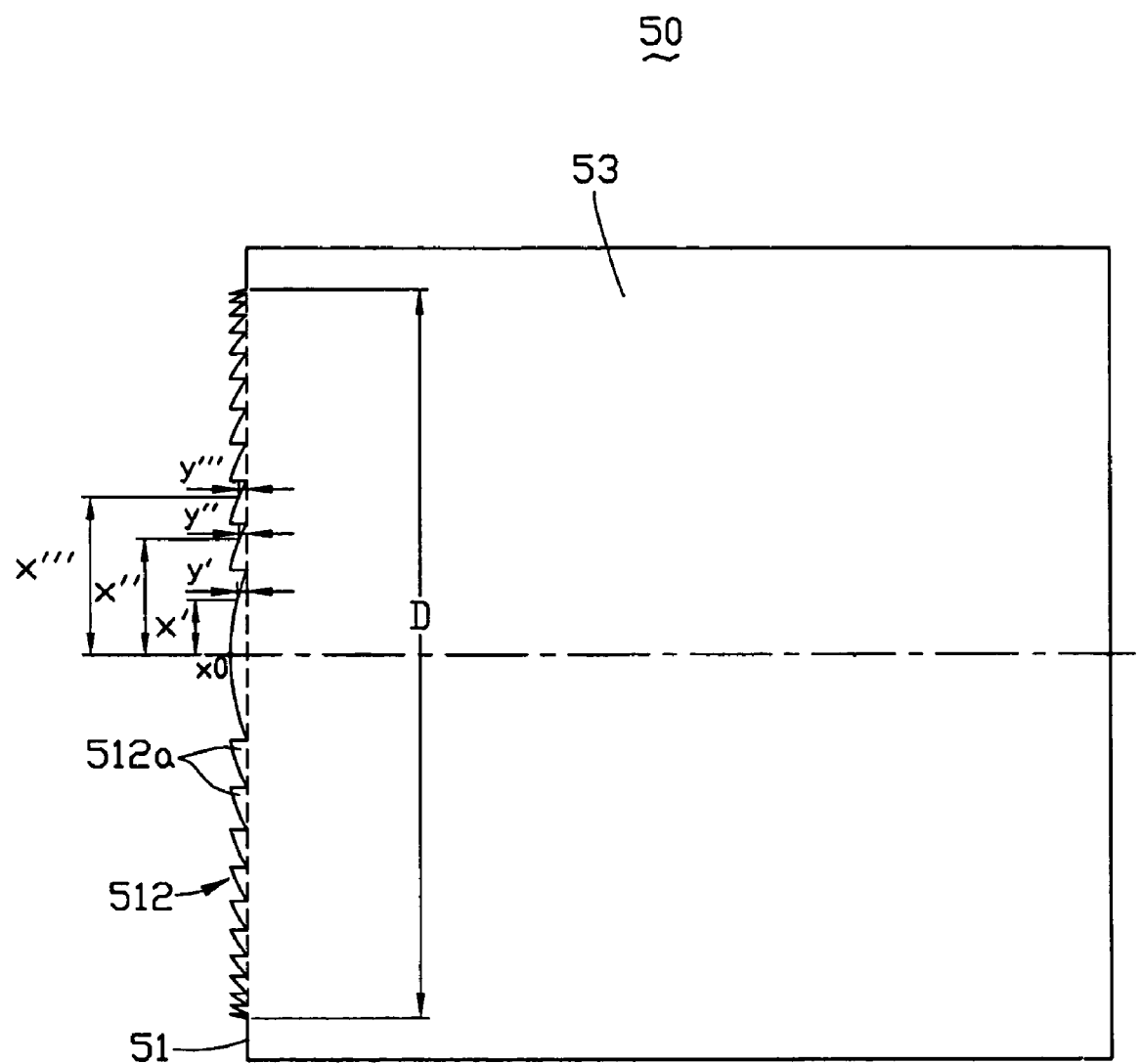
FIG. 2 is a top plan view of the LGP of FIG. 1.

Referring to FIGS. 1 and 2, a plate-like light guide member (LGP) 50 according to a first embodiment of the present invention is shown. The LGP 50 is substantially a rectangular sheet having a generally uniform thickness, and includes: a light incident portion 51 for receiving light; a light reflecting portion 52 for reflecting light input through the light incident portion 51; a light emitting portion 53 opposite to the light reflecting portion 52, for outputting the reflected light; and several side portions (not labeled). In detail, the light incident portion 51 is generally located at a side face of the LGP 50 that neighbors LEDs 70 used as light sources. The light reflecting portion 52 is generally located at a bottom face of the LGP 50, and includes a plurality of tiny reflective grooves 521 for reflecting of light thereat. As is known to those skilled in the art, the reflective grooves 521 can be replaced by other suitable reflective structures, such as an array of protrusions. The light emitting portion 53 is located at a top face of the LGP 50 opposite to the light reflecting portion 52.

The light incident portion 51 includes a first diffractive optical element 512. Preferably, the first diffractive optical element 512 has a symmetrical configuration, which includes a plurality of optical sub-elements (such as protrusions 512a) symmetrically formed at the light incident portion 51. In the illustrated embodiment, the protrusions 512a have convex, arc-shaped profiles. The convex, arc-shaped profiles of all the protrusions 512a extend from a common imaginary plane (shown as a short dash line in FIG. 2; hereinafter, "the imaginary plane") that extends across the light incident portion 51 at an inmost end of the first diffractive optical element 512. Each convex, arc-shaped profile is shaped like part of a segment on a chord of a circle. That is, one arc-shaped line defining one side of the convex, arc-shaped profile extends outwardly from the imaginary plane and generally toward a central axis of symmetry (shown as a long-and-short dash line in FIG. 2; hereinafter, "the central axis") of the first diffractive optical element 512; and a line defining an adjoining planar side of the convex, arc-shaped profile nearest the central axis extends perpendicularly outwardly from the imaginary plane to the arc-shaped side. That is, the planar side is parallel to the central axis. In alternative embodiments, the protrusions 512a can have convex profiles that are arcuate or curved; that is, one side of each convex profile is arcuate or curved. The first diffractive optical element 512 has a phase retardation represented by φ(x), which satisfies the following equation (1):

$$\phi(x) = k_0 n_2 (f - \sqrt{f^2 + x^2}),$$

wherein: f represents a focal length of the first diffractive optical element 512, and is preferably in the range from about 2 mm to about 10 mm; $n_2$ represents an index of refraction of a material located at a focus of the first diffractive optical element 512; $k_0$ represents a quantity of waves of the light input through the light incident portion 51; and x represents a shortest distance from any point on an arc-shaped surface of the first diffractive optical element 512 to the central axis of the first diffractive optical element 512. $k_0$ is calculated by the following equation: $k_0 = 2\pi/\lambda$, where λ represents a wavelength of the light input through the light incident portion 51 if such light travels in a vacuum. Examples of x are illustrated in FIG. 2. x' is the distance from a first point on a first arc-shaped surface of the first diffractive optical element 512 to the central axis, x" is the distance from a second point on a second arc-shaped surface of the first diffractive optical element 512 to the central axis, and x''' is the distance from a third point on a third arc-shaped surface of the first diffractive optical element 512 to the central axis. x is determined according to a size of the LGP 50, and is preferably in the range from −15 mm to +15 mm.

Furthermore, any point on an arc-shaped surface of the first diffractive optical element 512 defines a depth represented by y, which is a shortest distance from the point on the arc-shaped surface of the first diffractive optical element 512 to the imaginary plane. Thus any point on an arc-shaped surface of the first diffractive optical element 512 defines both an x value and a y value. For example, y' is the distance from the first point on the first arc-shaped surface of the first diffractive optical element 512 to the imaginary plane, y'' is the distance from the second point on the second arc-shaped surface of the first diffractive optical element 512 to the imaginary plane, and y''' is the distance from the third point on the third arc-shaped surface of the first diffractive optical element 512 to the imaginary plane. Generally, y varies from several microns to several hundred microns, and satisfies the following equation (2):

$$y(x) = \frac{n_2}{n_1 - n_2} \left| \sqrt{f^2 + x^2} - f - m\lambda_2 \right| y(x) = \frac{n_2}{n_1 - n_2} \left( \sqrt{f^2 + x^2} - f - m\lambda_2 \right)$$

$$x_{m-1} \leq |x| \leq \min(x_m, D/2), \qquad x_{m-1} \leq |x| \leq \min(x_m, D/2).$$

wherein $n_1$ represents an index of refraction of a material of the first diffractive optical element 512; D represents a length of the first diffractive optical element 512; m represents a sequence number of the protrusion 512a which the measured point is located on, and is any natural number up to $m_{max}$, with the protrusion 512a adjacent the central axis having an m value of 1 and the protrusion 512a farthest from the central axis having an m value of $m_{max}$; $\lambda_2$ represents a wavelength calculated by the following equation: $\lambda_2 = \lambda/n_2$; and $x_m$ represents a shortest distance from an apex of the $(m+1)^{th}$ protrusion 512a to the central axis, and is calculated by the following equation (3):

$$x_m = [2mf\lambda_2 + (m\lambda_2)^2]^{1/2}, \text{ and } x_0 = 0.$$

As described above, in the illustrated embodiment, the planar side of each protrusion 512a is parallel to the central axis. Furthermore, the apexes of all the protrusions 512a have the same depth $y_{max}$. That is, $$y_{max} = y(x_0) = y(x_m) = \left| \frac{n_2}{n_1 - n_2} (1 * \lambda_2) \right|.$$

In the first embodiment, as described above, the first diffractive optical element 512 protrudes outwardly from a main body of the LGP 50. The first diffractive optical element 512 is symmetrically configured at the light incident portion 51, for efficient use of the LEDs 70. Alternatively, the light incident portion 51 may include several first diffractive optical elements 512, each first diffractive optical element 512 corresponding to a respective LED 70.

The LGP 50 is generally made of a transparent material such as polymethyl methacrylate (PMMA), polycarbonate, or any other suitable moldable transparent material. The LEDs 70 may be replaced by a linear light source such as a cold cathode fluorescent lamp (CCFL). Further or alternatively, one or more extra LEDs 70 may be provided adjacent other side portions of the LGP 50 according to need. In such cases, the other side portions of the LGP 50 may be provided with one or more first diffractive optical elements 512 accordingly.

Figure 3A:
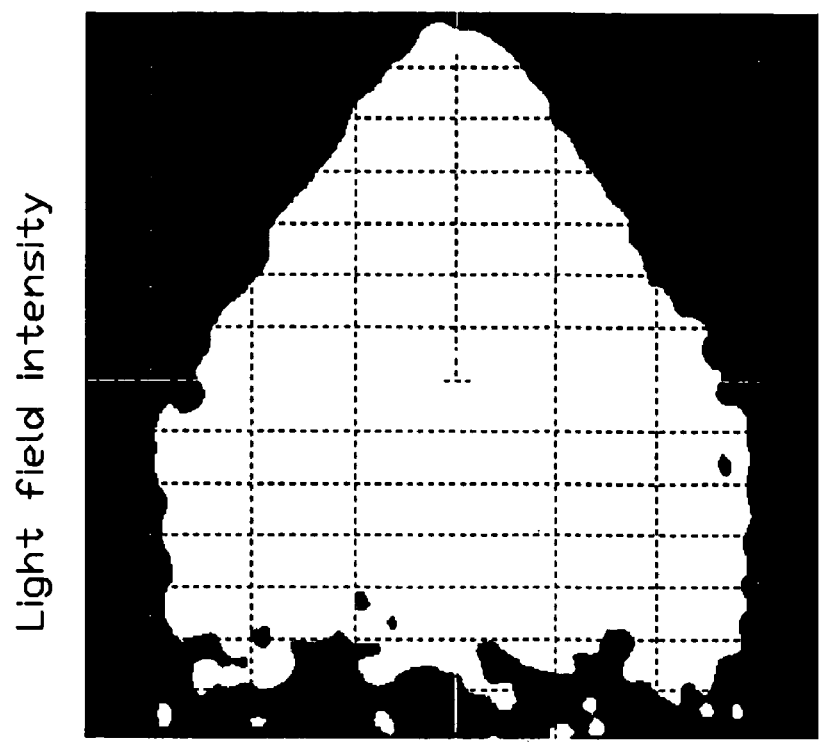
FIG. 3A is a diagram showing a distribution of light field intensity of a conventional LGP, the LGP employing one LED positioned adjacent a center of a light incident portion of the LGP.
Figure 3B:
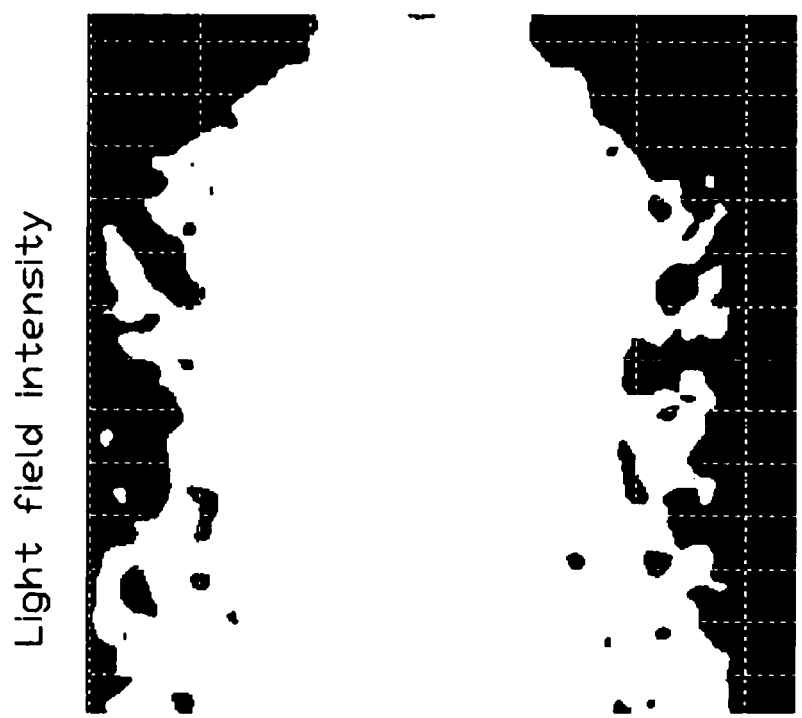
FIG. 3B is a diagram showing a distribution of light field intensity of the LGP of FIG. 1, the LGP employing one LED positioned adjacent a center of a light incident portion of the LGP.

FIGS. 3A and 3B show distributions of light field intensity of two different LGPs, each LGP employing one LED 70 positioned adjacent a center of a light incident portion of the LGP. FIG. 3A shows the distribution for a conventional LGP which does not have any diffractive optical element at a light incident portion thereof, nor at a light emitting portion thereof. FIG. 3B shows the distribution for the LGP 50, which has the first diffractive optical element 512 at the light incident portion 51 thereof. Some parameters of the LGP 50 are as follows: f=3 mm; x is in the range from −3 mm to +3 mm; $y_{max}$ is 0.41 mm; $n_1$=1.49; and $n_2$=1. In each case, the LED 70 emits visible light having a wavelength of 0.55 microns. As can be seen, the distribution area of high light intensity in FIG. 3B is distinctly larger than that in FIG. 3A. This demonstrates that the first diffractive optical element 512 significantly improves the light field intensity of the LGP 50.

As described above, the first diffractive optical element 512 is arranged along the light incident portion 51 of the LGP 50. Thereby, the overall size of the LGP 50 can be compact. Furthermore, in general, diffractive optical elements such as the first diffractive optical element 512 have certain favorable characteristic features, such as easy configurability according to need, and good capability to control light beams. As regards configurability, for example, the first diffractive optical element 512 can be tailored according to different locations or sizes of the LEDs 70 used. As regards capability to control light beams, when light beams of various incident angles enter the LGP 50 through the light incident portion 51 having the first diffractive optical element 512, the light beams are easily and efficiently corrected and coupled into the LGP 50. As a result, light energy is more efficiently utilized, and the LGP 50 has high brightness and low energy loss. Further, shadows that may otherwise exist in the LGP 50 in regions between the separate LEDs 70 can be eliminated, thereby achieving a uniform distribution of brightness.

Figure 4:
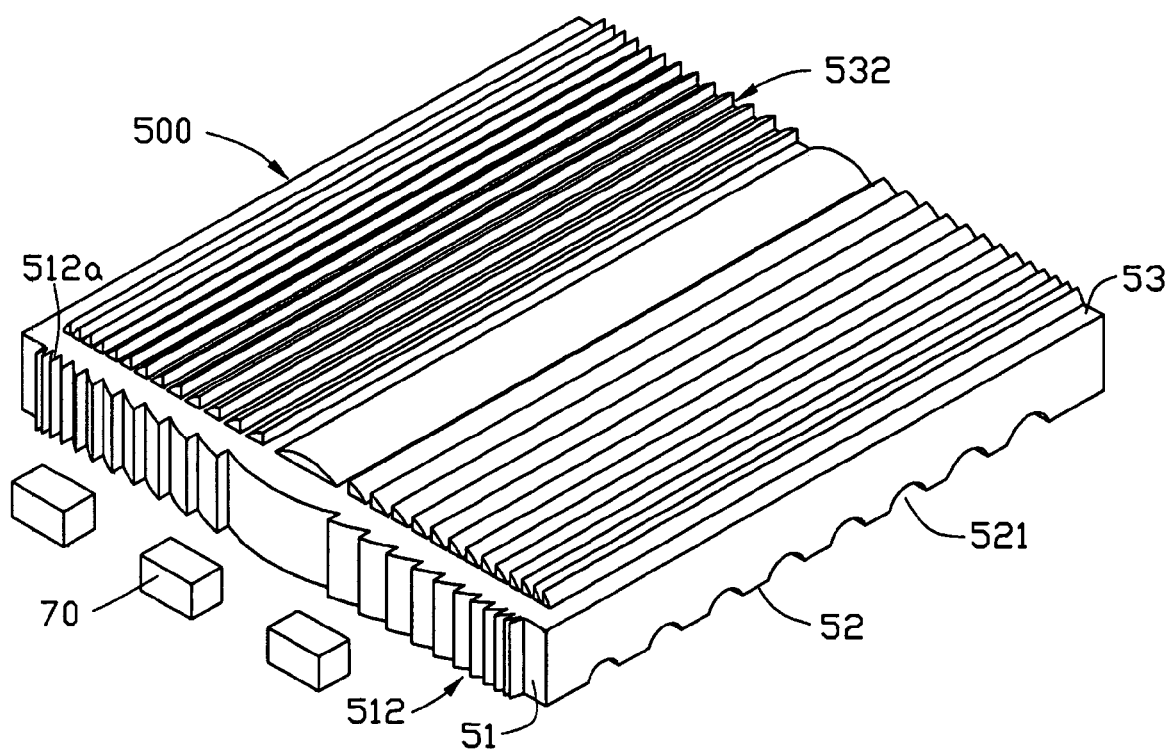
FIG. 4 is a simplified, isometric view of an LGP in accordance with a second embodiment of the present invention, together with three LEDs.

Referring to FIG. 4, an LGP 500 according to a second embodiment of the present invention is shown. The LGP 500 is similar to the LGP 50 of the first embodiment. The main difference between the LGP 500 and LGP 50 is that the LGP 500 further includes a second diffractive optical element 532 formed at the light emitting portion 53. The second diffractive optical element 532 has a phase retardation φ(x) satisfying the above-described equation (1). Any point on an arc-shaped surface of the second diffractive optical element 532 defines a depth y that satisfies the above equation (2). Other parameters of the second diffractive optical element 532 are generally different from those of the first diffractive optical element 512. Furthermore, the second diffractive optical element 532 comprises elongate protrusions, each of which spans from one end of the LGP 500 adjacent the light incident portion 51 to an opposite end of the LGP 500 distal from the light incident portion 51. The second diffractive optical element 532 controls the directions of light beams emitted out from the LGP 500, and helps achieve uniform distribution of brightness of such light beams. In alternative embodiments, the second diffractive optical element 532 may be replaced by other suitable structures and configurations, such as prisms, grooves, etc.

Figure 5A:
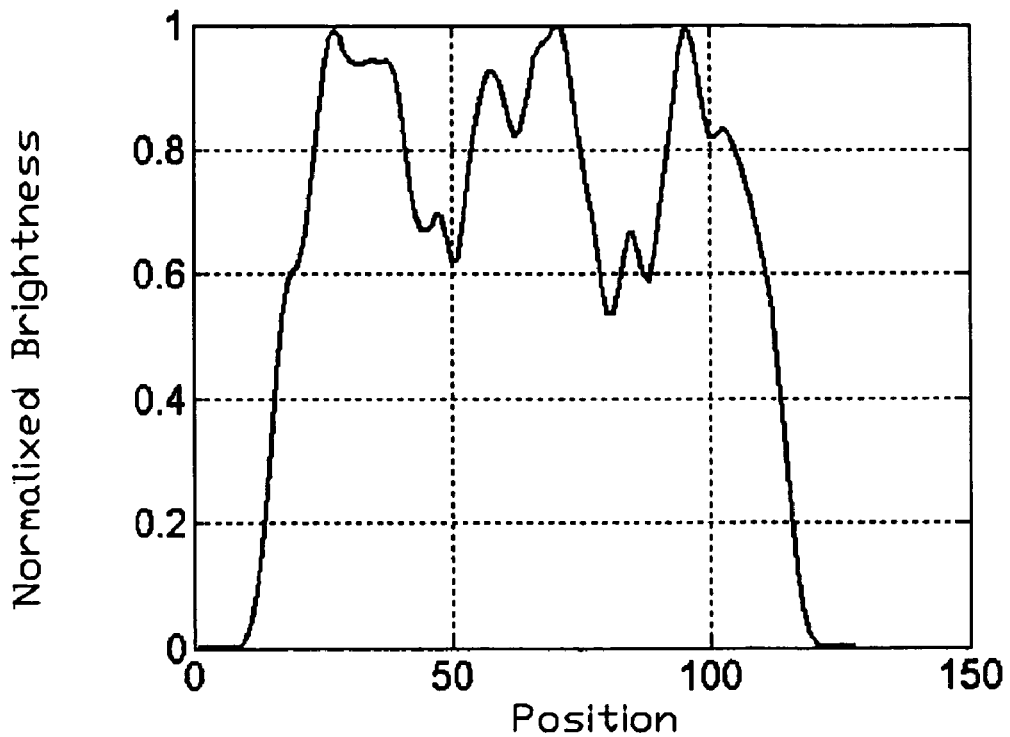
FIG. 5A is a graph showing a brightness distribution of a light field of a conventional LGP, the LGP employing three LEDs as light sources.
Figure 5B:
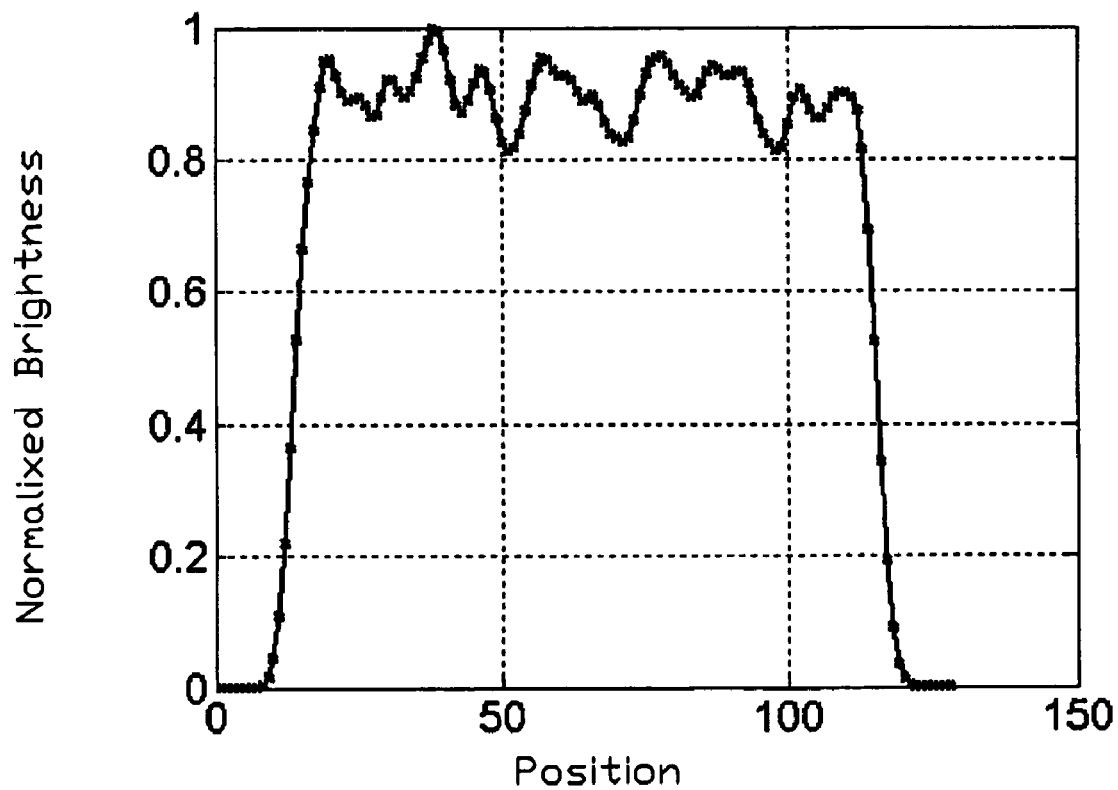
FIG. 5B is a graph showing a brightness distribution of a light field of the LGP of FIG. 4, the LGP employing three LEDs as light sources.

Referring to FIGS. 5A and 5B, these show distributions of measured, normalized brightness of light fields of two different LGPs, each LGP employing three LEDs 70 as light sources. FIG. 5A shows the distribution for a conventional LGP which does not have any diffractive optical elements at a light incident portion thereof, nor at a light emitting portion thereof FIG. 5B shows the distribution for the LGP 500, which has the first diffractive optical element 512 at the light incident portion 51 thereof, and the second diffractive optical element 532 at the light emitting portion 53 thereof. Some parameters of the first and second diffractive optical elements 512, 532 are as follows:

(1) For the first diffractive optical element 512: f=3 mm; x is in the range from −15 mm to +15 mm; $y_{max}$ is 0.8841 mm; $n_1$=1.49; and $n_2$=1.

(2) For the second diffractive optical element 532: f=10 mm; x is in the range from −15 mm to +15 mm; $y_{max}$ is 0.6316 mm; $n_1$=1.49; and $n_2$=1.

The LEDs 70 emit visible light having a wavelength of 0.55 microns.

As can be seen in FIGS. 5A and 5B, along a longitudinal direction of each of the measured LGPs, the light field of the conventional LGP has some shadows which are corrected in the light field of the LGP 500. This demonstrates that the first and second diffractive optical elements 512, 532 significantly improve the light field of the LGP 500.

Figure 6:
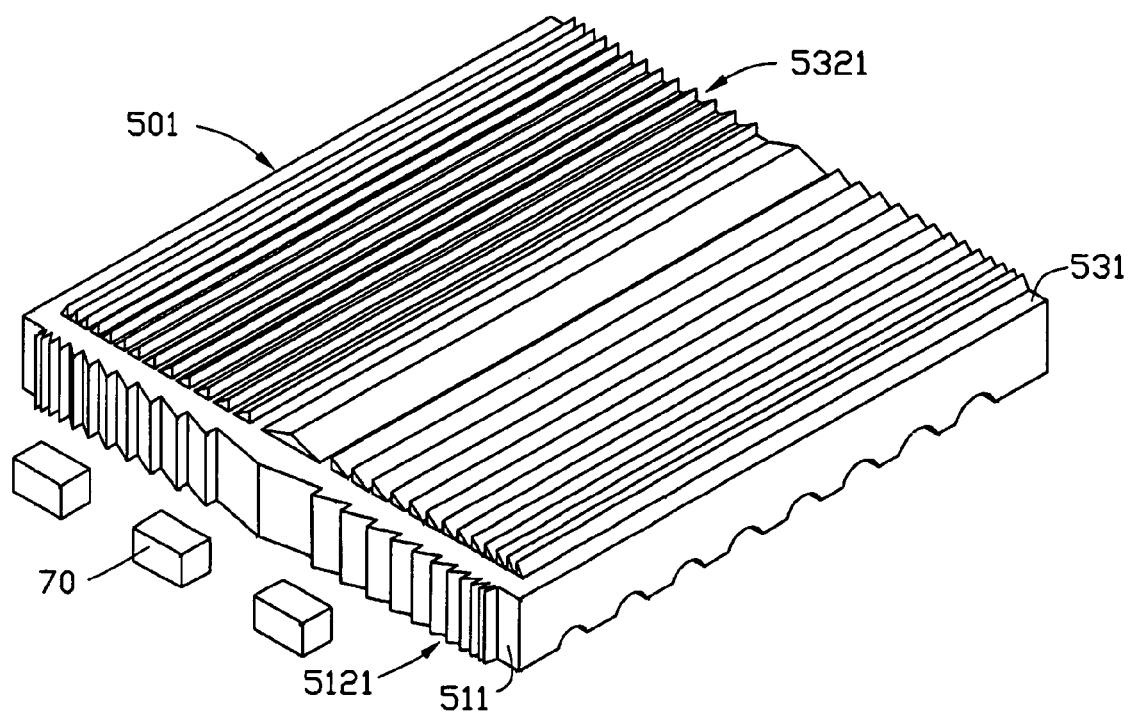
FIG. 6 is a simplified, isometric view of an LGP in accordance with a third embodiment of the present invention, together with three LEDs.

Referring to FIG. 6, an LGP 501 according to a third embodiment of the present invention is shown. The LGP 501 is similar to the LGP 500 of the second embodiment. However, the LGP 501 includes a first diffractive optical element 5121 formed at a light incident portion 511 thereof, and a second diffractive optical element 5321 formed at a light emitting portion 531 thereof. The first diffractive optical element 5121 has a plurality of protrusions (not labeled). The protrusions have flat surfaces and rectilinear profiles. That is, each protrusion defines a triangular profile that includes part of a common imaginary plane (not shown) that extends across the light incident portion 511 at an inmost end of the first diffractive optical element 5121. A line defining a long side of each triangular profile extends outwardly from the imaginary plane and generally toward a central axis of symmetry of the first diffractive optical element 5121. A line defining an adjoining short side of the triangular profile nearest the central axis extends perpendicularly outwardly from the imaginary plane to the long side. That is, the short side is parallel to the central axis. The configurations of protrusions of the second diffractive optical element 5321 are similar to the configurations of the protrusions of the first diffractive optical element 5121. Compared with the LGP 500 having the first and second diffractive optical elements 512, 532 with the arc-shaped protrusions, it is easier to manufacture the LGP 501 having the first and second diffractive optical elements 5121, 5321 with the rectilinear protrusions.

Figure 7:
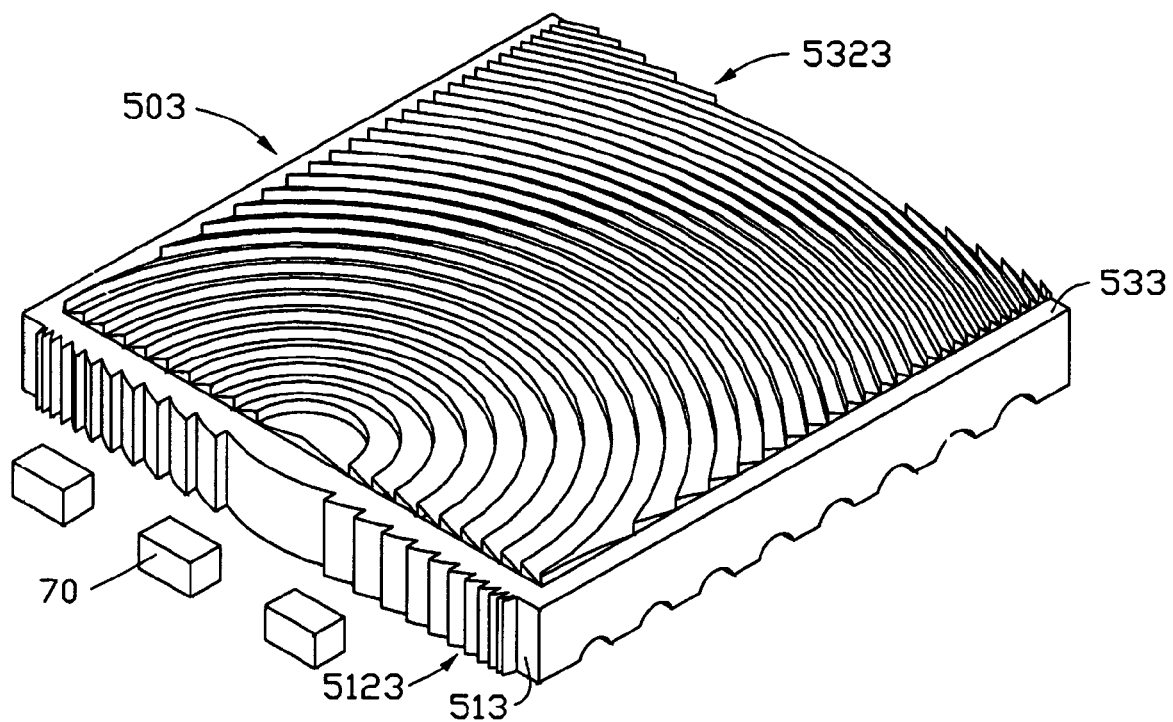
FIG. 7 is a simplified, isometric view of an LGP in accordance with a fourth embodiment of the present invention, together with three LEDs.

Referring to FIG. 7, an LGP 503 according to a fourth embodiment of the present invention is shown. The LGP 503 is similar to the LGP 500 of the second embodiment. The LGP 503 includes a first diffractive optical element 5123 formed at a light incident portion 513 thereof, and a second diffractive optical element 5323 formed at a light emitting portion 533 thereof. The first diffractive optical element 5123 is essentially the same as the first diffractive optical element 512 of the LGP 500. However, the second diffractive optical element 5323 comprises parallel, arc-shaped protrusions (not labeled). The protrusions form a part of a series of imaginary concentric rings. The protrusions may have convex, arc-shaped cross-sections similar to the profiles of the protrusions of the second diffractive optical element 532 of the LGP 500. Alternatively, the protrusions may have convex cross-sections that are arcuate or curved, or rectilinear cross-sections. In the illustrated embodiment, the protrusions have rectilinear cross-sections.

Figure 8:
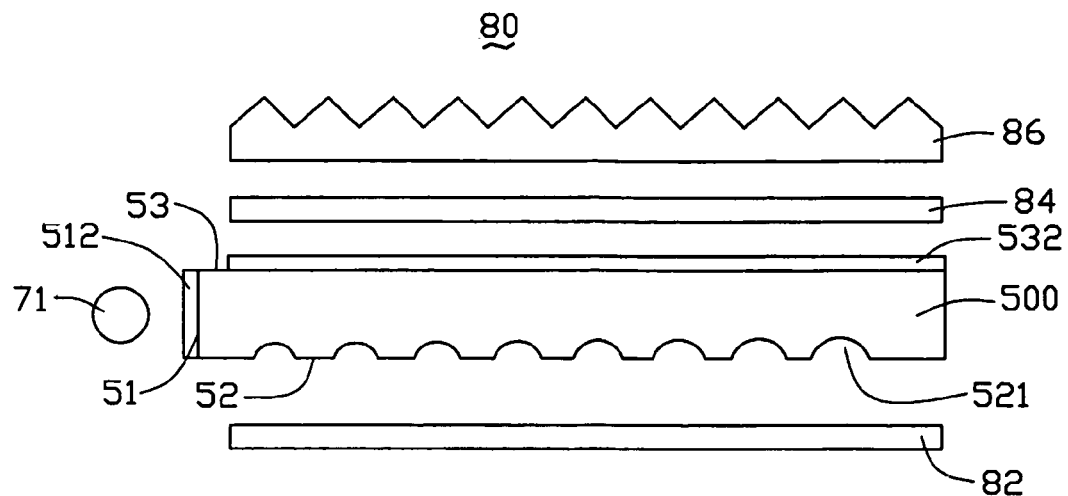
FIG. 8 is a simplified, exploded, side view of a backlight assembly using the LGP of FIG. 4.

Referring to FIG. 8, a backlight assembly 80 includes the LGP 500. The backlight assembly 80 generally includes a linear light source 71, the LGP 500 having the light incident portion 51 facing the linear light source 71, a reflecting plate 82 facing the light reflecting portion 52 of the LGP 500, a diffusing plate 84 facing the light emitting portion 53 of the LGP 500, and a brightness-enhancing plate 86 stacked on the diffusing plate 84. The reflecting plate 82 generally reflects light back into the LGP 500, for increasing a light energy utilization rate. The diffusing plate 84 and the brightness-enhancing plate 86 are used to change directions of light beams exiting the light emitting portion 53 of the LGP 500, so that the directions become substantially perpendicular to the light emitting portion 53.

Figure 9:
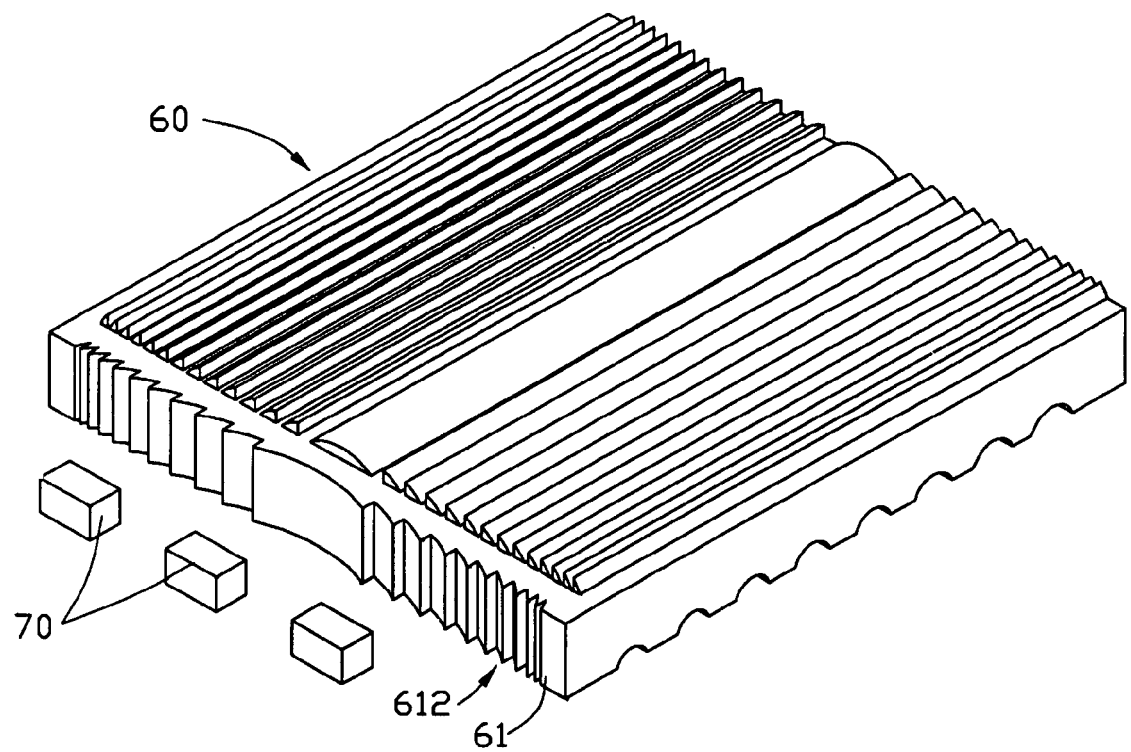
FIG. 9 is a simplified, isometric view of an LGP in accordance with a fifth embodiment of the present invention, together with three LEDs.

Referring to FIG. 9, an LGP 60 according to a fifth embodiment of the present invention is shown. The LGP 60 is similar to the LGP 500 of the second embodiment. The main difference of the LGP 60 is that it has a light incident portion 61 with a first diffractive optical element 612. The first diffractive optical element 612 defines a plurality of symmetrical cutouts (not labeled). Configurations of the cutouts are the same as configurations of the protrusions 512a of the LGP 500, except that the cutouts are concave whereas the protrusions 512a are convex. In alternative embodiments, the cutouts may be configured to define arcuate or curved profiles/cross-sections or rectilinear profiles/cross-sections, in similar fashion to various configurations described above in relation to the LGP 50 of the first embodiment and the LGP 501 of the third embodiment.

Figure 10:
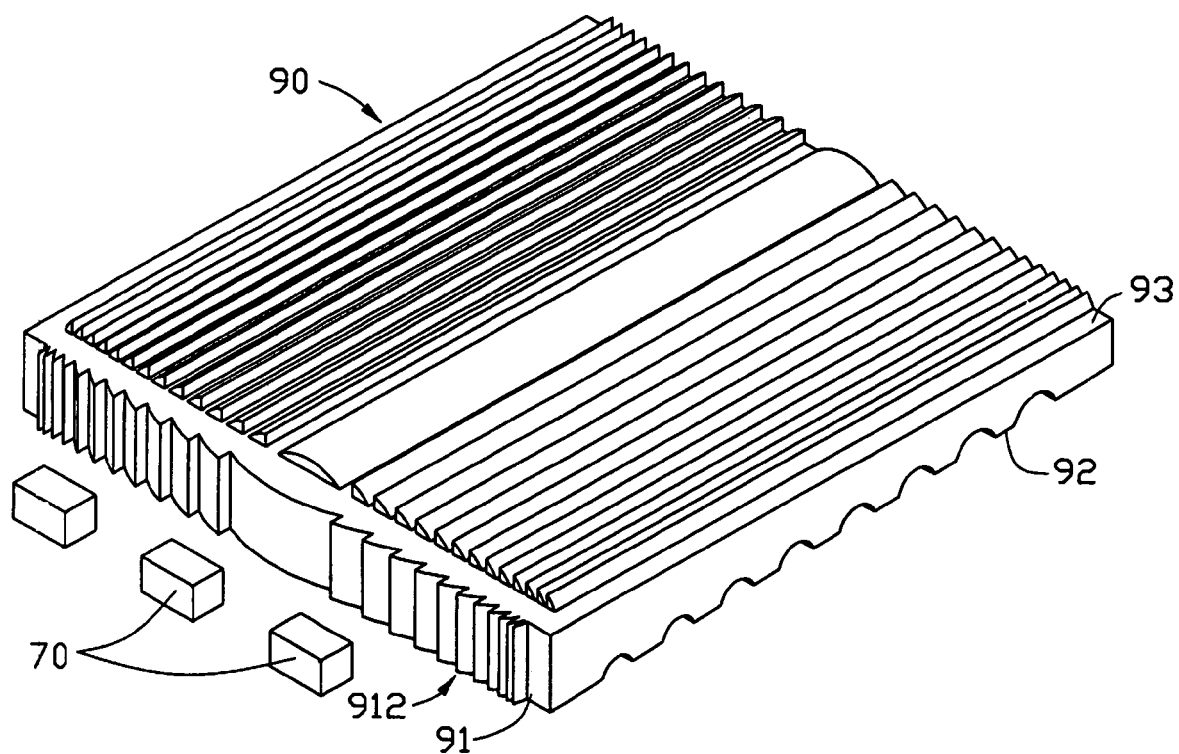
FIG. 10 is a simplified, isometric view of an LGP in accordance with a sixth embodiment of the present invention, together with three LEDs.
Figure 11:
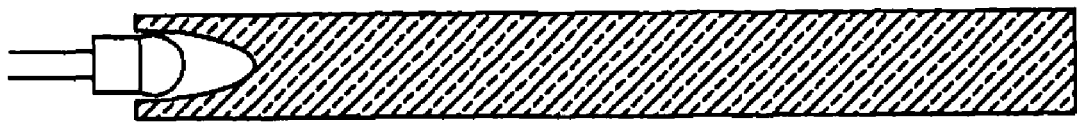
FIG. 11 is a schematic, side cut-away view of a conventional backlight assembly.
Figure 12:
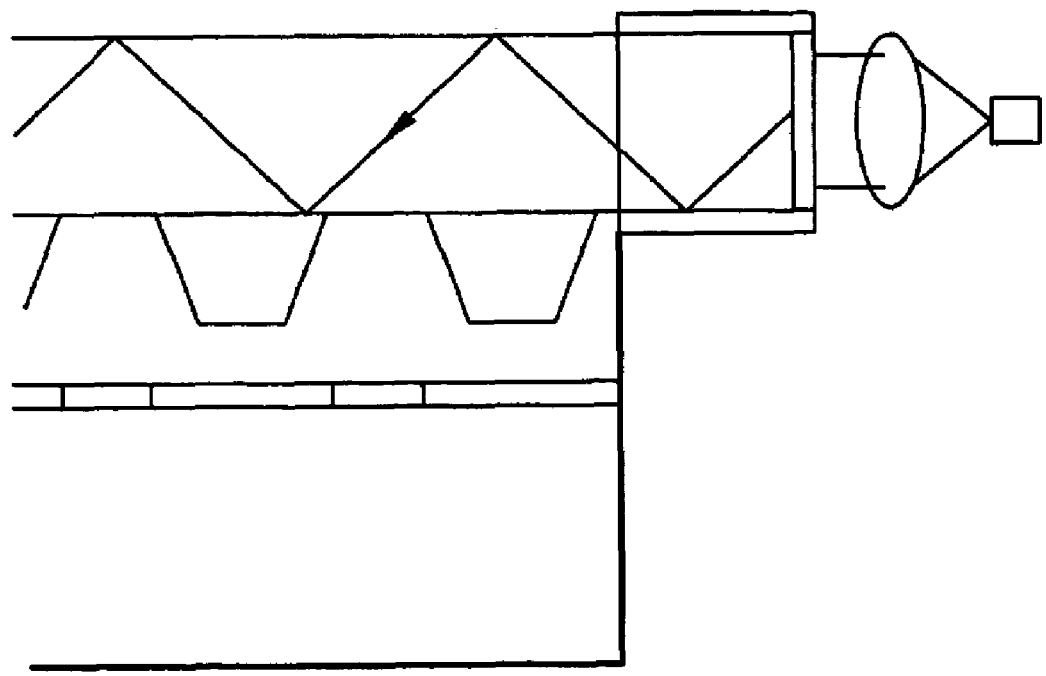
FIG. 12 is a schematic, side view of another conventional backlight assembly, showing essential optical paths thereof.

Referring to FIG. 10, a wedge-shaped LGP 90 according to a sixth embodiment of the present invention is shown. The LGP 90 includes a light incident portion 91, a light reflecting portion 92, a light emitting portion 93, and several side portions (not labeled). The light incident portion 91 includes a first diffractive optical element 912, which is essentially the same as the first diffractive optical element 512 of the LGP 500 of the second embodiment. The light emitting portion 93 includes a second diffractive optical element (not labeled), which is essentially the same as the second diffractive optical element 532 of the LGP 500.

It will be understood by those skilled in the art that the above-described protrusions of the various diffractive optical elements may be configured otherwise than having arc-shaped, arcuate or curved convex profiles/cross-sections or rectilinear profiles/cross-sections. For example, the protrusions may each be configured to have cross-sections of varying shape, such that surfaces of the protrusions are rounded or partially hemispherical. In one or more of such alternative embodiments, a diffractive optical element may define a focal point rather than a focal line. Similarly, the above-described cutouts of the LGP 60 of the fifth embodiment may be configured otherwise than defining arc-shaped, arcuate or curved convex profiles/cross-sections or rectilinear profiles/cross-sections.

It should also be noted that the above-described embodiments of LGPs and a backlight assembly have been provided for the purposes of illustrating the present invention. They are not critical to practicing the present invention. A variety of other LGPs and backlight assemblies may be suitably adapted for practicing the present invention. Furthermore, the LGPs according to the present invention may be utilized in apparatuses other than backlight assemblies. For example, the LGPs may be utilized in surface light sources, frontlight assemblies, or front illumination applications.

Finally, while the present invention has been described with reference to particular embodiments, the description is intended to be illustrative of the invention and is not to be construed as limiting the invention. Therefore, various modifications can be made to the embodiments by those skilled in the art without departing from the true spirit and scope of the invention as defined by the appended claims.

We claim:

1. A light guide plate comprising:
a light incident portion for receiving light, the light incident portion including at least one first diffractive optical element located thereat;
a light reflecting portion for reflecting at least a portion of the light input through the light incident portion; and
a light emitting portion opposite to the light reflecting portion for outputting the input light including the reflected light, wherein the at least one first diffractive optical element comprises a plurality of protrusions each having a curved surface, at least two of the protrusions are arranged symmetrically opposite to each other across a central axis of symmetry of the at least one first diffractive optical element, and the at least one first diffractive optical element has a phase retardation represented by $\phi(x)$, which satisfies the following equation:

$$\phi(x)=k_0 n_2(f-\sqrt{f^2+x^2}),$$

wherein f represents a focal length of the at least one first diffractive optical element, $n_2$ represents an index of refraction of a material located at a focus of the at least one first diffractive optical element, x represents a distance from any point on a curved surface of the at least one first diffractive optical element to the central axis of symmetry, $k_0$ represents a quantity of waves of the light input through the at least one first diffractive optical element, and is calculated by the following equation: $k_0=2\pi/\lambda$, and $\lambda$ represents a wavelength of the light input through the at least one first diffractive optical element if such light travels in a vacuum.

2. The light guide plate according to claim 1, wherein any point on a curved surface of the at least one first diffractive optical element has a depth to a common imaginary plane that extends across the light incident portion at an inmost end of the at least one first diffractive optical element, and the depth is represented by y(x), which satisfies the following equation:

$$y(x) = \frac{n_2}{n_1 - n_2}\left|\sqrt{f^2 + x^2} - f - m\lambda_2\right|$$

$$x_{m-1} \le |x| \le \min(x_m, D/2),$$

wherein $n_1$ represents an index of refraction of a material of the at least one first diffractive optical element, D represents a length of the at least one first diffractive optical element, and
$\lambda_2$ is calculated by the following equation:

$$\lambda_2=\lambda/n_2,$$

and wherein m represents a sequence number of a protrusion which the measured point is located on, and is any natural number up to $m_{max}$, with the protrusion adjacent the central axis of symmetry having an m value of 1 and the protrusion farthest from the central axis of symmetry having an m value of $m_{max}$, and $x_m$ represents a shortest distance from an apex of each of the protrusions to the central axis, which is calculated by the following equation:

$$x_m=[2mf\lambda_2+(m\lambda_2)^2]^{1/2}, \text{ and } x_0=0.$$

3. The light guide plate according to claim 1, wherein the at least one first diffractive optical element comprises a plurality of protrusions each having at least one flat surface, and at least two of the protrusions are arranged symmetrically opposite to each other across a central axis of symmetry of the at least one first diffractive optical element.

4. The light guide plate according to claim 1, wherein the at least one first diffractive optical element protrudes outwardly from a main body of the light guide plate.

5. The light guide plate according to claim 1, wherein the at least one first diffractive optical element defines a plurality of cutouts each having a curved extremity, and at least two of the cutouts are arranged symmetrically opposite to each other across a central axis of symmetry of the at least one first diffractive optical element.

6. The light guide plate according to claim 1, wherein the light emitting portion includes at least one second diffractive optical element located thereat.

7. The light guide plate according to claim 6, wherein the at least one second diffractive optical element comprises a plurality of elongate, curved protrusions, and at least two of the protrusions are arranged symmetrically opposite to each other across a central axis of symmetry of the at least one second diffractive optical element.

8. The light guide plate according to claim 6, wherein the at least one second diffractive optical element comprises a plurality of elongate protrusions having flat surfaces, and at least two of the protrusions are arranged symmetrically opposite to each other across a central axis of symmetry of the at least one second diffractive optical element.

9. The light guide plate according to claim 1, wherein the light guide plate is substantially a rectangular sheet having a generally uniform thickness, or is substantially wedge-shaped.

10. A surface light source comprising:
a light source, and
a light guide plate including: a light incident portion for receiving light emitted from the light source, the light incident portion including at least one first diffractive optical element located thereon; a light reflecting portion for reflecting at least a portion of the light input through the light incident portion; and a light emitting portion opposite to the light reflecting portion for outputting the input light including the reflected light, wherein the at least one first diffractive optical element comprises a plurality of protrusions each having a curved surface, at least two of the protrusions are arranged symmetrically opposite to each other across a central axis of symmetry of the at least one first diffractive optical element, and the at least one first diffractive optical element has a phase retardation represented by $\phi(x)$, which satisfies the following equation:

$$\phi(x)=k_0 n_2(f-\sqrt{f^2+x^2}),$$

wherein f represents a focal length of the at least one first diffractive optical element, $n_2$ represents an index of refraction of a material located at a focus of the at least one first diffractive optical element, x represents a distance from any point on a curved surface of the at least one first diffractive optical element to the central axis of symmetry, $k_0$ represents a quantity of waves of the light input through the at least one first diffractive optical element, and is calculated by the following equation: $k_0=2\pi/\lambda$, and $\lambda$ represents a wavelength of the light input through the at least one first diffractive optical element if such light travels in a vacuum.

11. The surface light source according to claim 10, wherein the at least one first diffractive optical element has a depth represented by $y(x)$, which satisfies the following equation:

$$y(x) = \frac{n_2}{n_1 - n_2}\left|\sqrt{f^2 + x^2} - f - m\lambda_2\right|$$

$$x_{m-1} \leq |x| \leq \min(x_m, D/2),$$

wherein $n_1$ represents an index of refraction of a material of the at least one first diffractive optical element, D represents a length of the at least one first diffractive optical element, and $\lambda_2$ is calculated by the following equation:

$$\lambda_2 = \lambda/n_2,$$

and wherein m represents a sequence number of a protrusion which the measured point is located on, and is any natural number up to $m_{max}$, with the protrusion adjacent the central axis of symmetry having an m value of 1 and the protrusion farthest from the central axis of symmetry having an m value of $m_{max}$, and $x_m$ represents a shortest distance from an apex of each of the protrusions to the central axis, which is calculated by the following equation:

$$x_m = [2mf\lambda_2 + (m\lambda_2)^2]^{1/2}, \text{ and } x_0 = 0.$$

12. The surface light source according to claim 11, wherein the apexes of each of the protrusions have a same depth $y(x)$.

13. The surface light source according to claim 10, wherein the at least one first diffractive optical element comprises a plurality of protrusions each having at least one flat surface, and at least two of the protrusions are arranged symmetrically opposite to each other across a central axis of symmetry of the at least one first diffractive optical element.

14. The surface light source according to claim 10, wherein the at least one first diffractive optical element defines a plurality of cutouts each having a curved extremity, and at least two of the cutouts are arranged symmetrically opposite to each other across a central axis of symmetry of the at least one first diffractive optical element.

15. The surface light source according to claim 10, wherein the light emitting portion includes at least one second diffractive optical element.

* * * * *